United States Patent
Morino et al.

(10) Patent No.: US 10,955,028 B2
(45) Date of Patent: Mar. 23, 2021

(54) TRANSMISSION BELT

(71) Applicant: TOYOTA JIDOSHA KABUSHIKI KAISHA, Toyota (JP)

(72) Inventors: Takuro Morino, Nagoya (JP); Ichiro Aoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 266 days.

(21) Appl. No.: 16/132,940

(22) Filed: Sep. 17, 2018

(65) Prior Publication Data

US 2019/0107173 A1 Apr. 11, 2019

(30) Foreign Application Priority Data

Oct. 10, 2017 (JP) .............................. JP2017-197227

(51) Int. Cl.
*F16G 5/16* (2006.01)
(52) U.S. Cl.
CPC ...................................... *F16G 5/16* (2013.01)
(58) Field of Classification Search
CPC ... F16G 5/16; F16G 5/166; F16G 5/18; F16G 5/163; F16H 9/125
USPC ........................................................ 474/242
See application file for complete search history.

(56) References Cited

U.S. PATENT DOCUMENTS

| | | | | |
|---|---|---|---|---|
| 3,604,283 A * | 9/1971 | Van Doorne | ............. | F16H 9/12 474/8 |
| 4,655,733 A * | 4/1987 | Jonason | ..................... | F16G 5/16 474/206 |
| 4,698,050 A * | 10/1987 | Hattori | ...................... | F16G 5/16 474/201 |
| 4,915,677 A * | 4/1990 | Simon | ....................... | F16G 5/16 474/242 |
| 5,004,450 A * | 4/1991 | Ide | ............................ | F16G 5/16 474/242 |
| 6,283,882 B1 * | 9/2001 | Nonaka | ................... | F16G 5/166 474/242 |
| 6,440,024 B1 * | 8/2002 | Kobayashi | ............... | F16G 5/16 474/242 |

(Continued)

FOREIGN PATENT DOCUMENTS

| CN | 103649583 A | 3/2014 |
|---|---|---|
| JP | 2008-215479 A | 9/2008 |

(Continued)

*Primary Examiner* — Henry Y Liu
(74) *Attorney, Agent, or Firm* — Oliff PLC

(57) ABSTRACT

A transmission belt that is to be mounted on pulleys, for transmitting a force between the pulleys. The transmission belt includes: at least one endless annular hoop; and plate-shaped elements that are held by the at least hoop such that the elements are arranged in a circumferential direction of the transmission belt. The elements, each of which has a pair of flank surfaces at its widthwise opposite ends, are to be clamped between conical surfaces of a substantially V-shaped annular groove of each of the pulleys. A flank angle of each of the flank surfaces is larger than a cone-generating angle of each of the conical surfaces. The elements include first and second elements, such that each of the first elements is to be in contact at the flank surfaces with the conical surfaces, and has a width larger than a width of each of the second elements.

8 Claims, 4 Drawing Sheets

(56) References Cited

U.S. PATENT DOCUMENTS

| | | | | |
|---|---|---|---|---|
| 6,527,657 | B2* | 3/2003 | Sakakibara | F16G 5/18 |
| | | | | 474/242 |
| 6,926,631 | B2* | 8/2005 | Brandsma | F16G 5/16 |
| | | | | 474/17 |
| 7,037,225 | B2* | 5/2006 | Takagi | F16H 9/125 |
| | | | | 474/8 |
| 7,874,952 | B2* | 1/2011 | Tada | F16G 5/18 |
| | | | | 474/237 |
| 7,892,126 | B2* | 2/2011 | van Lith | F16G 5/163 |
| | | | | 474/242 |
| 8,038,559 | B2* | 10/2011 | Tada | F16G 5/18 |
| | | | | 474/155 |
| 8,449,418 | B2* | 5/2013 | Sakanaka | F16G 5/166 |
| | | | | 474/242 |
| 8,647,223 | B2* | 2/2014 | Kuwabara | F16G 5/16 |
| | | | | 474/242 |
| 9,279,475 | B2* | 3/2016 | Sumida | F16G 5/16 |
| 10,072,742 | B2* | 9/2018 | Van Der Meer | F16H 55/56 |
| 2003/0144097 | A1* | 7/2003 | Brandsnna | F16G 5/16 |
| | | | | 474/8 |
| 2007/0072721 | A1* | 3/2007 | Takagi | F16G 5/16 |
| | | | | 474/242 |
| 2008/0274848 | A1* | 11/2008 | Van Der Leest | F16H 9/24 |
| | | | | 474/201 |
| 2014/0221141 | A1* | 8/2014 | Van Der Sluis | F16G 5/16 |
| | | | | 474/242 |
| 2016/0319917 | A1* | 11/2016 | Van Der Meer | F16H 9/18 |

FOREIGN PATENT DOCUMENTS

| | | |
|---|---|---|
| JP | 2008-223938 A | 9/2008 |
| JP | 2014-518366 A | 7/2014 |

* cited by examiner

1

TRANSMISSION BELT

This application claims priority from Japanese Patent Application No. 2017-197227 filed on Oct. 10, 2017, the disclosure of which is herein incorporated by reference in its entirety.

FIELD OF THE INVENTION

The present invention relates to a transmission belt that is to be used in, for example, a belt-type continuously variable transmission, and more particularly to a technique for improving an efficiency of force transmission performed by the transmission belt.

BACKGROUND OF THE INVENTION

There is known a transmission belt to be mounted on a plurality of pulleys, for transmitting a force between the plurality of pulleys, for example, in a belt-type continuously variable transmission. The transmission belt includes (a) an endless annular hoop and (b) a multiplicity of plate-shaped elements that are held by the hoop such that the elements are arranged in a circumferential direction of the transmission belt, wherein each of the elements has a pair of flank surfaces at its widthwise opposite ends, and is to be clamped between a pair of conical surfaces of each of the pulleys, with the flank surfaces being in frictional contact with the conical surfaces of the pulley, for performing the force transmission between the pulleys. A transmission belt, which is disclosed in JP-2008-223938A, is an example of such a transmission belt. In the disclosed transmission belt, a plurality of types of elements having flank surfaces with different flank angles, so that the elements have various degrees of rigidity, for thereby reducing vibration and noise generated when each of the elements enters (or bites into) an annular groove of the pulley.

SUMMARY OF THE INVENTION

Although not yet being publicly known, there could be an arrangement in which the flank angle of the flank surfaces of each of the elements is larger than a cone-generating angle of the conical surfaces of the pulley, for thereby establishing a so-called "outer contact state" in which a pressing load acting between each conical surface and the corresponding flank surface is larger in an outer-peripheral-side portion of the corresponding flank surface than in an inner-peripheral-side portion of the flank surface. When the element enters the annular groove of the pulley, an attitude of the element is stabilized owing to the establishment of the outer contact state, whereby the force transmission efficiency is improved. FIG. 6 shows, by way of example, the arrangement in which the flank angle β of the flank surface 102 of the element 100 is larger than the cone-generating angle α of the conical surface 106 of the pulley 104, for thereby establishing the outer contact state in which a pressing load acting between the conical surface 106 and the flank surface 102 is larger in the outer-peripheral-side portion A than in the inner-peripheral-side portion, so that the attitude of the elements 100 is stabilized upon its entry into the groove of the pulley 104 whereby the force transmission efficiency is improved. It is noted that, in FIG. 6, the hoop, which is received in each of two recesses 108 of the element 100, is not shown. FIG. 6 shows a state in which the transmission belt is mounted on the pulley 106, wherein the outer-peripheral-side portion A of the flank surface 102 is located in a radially outer portion of the pulley 106 which corresponds to an upper portion of FIG. 6.

However, as the outer-peripheral-side portion A of the flank surface 102 is worn, a contact area of the flank surface 102, which is in contact with the conical surface 106, is gradually increased toward the inner-peripheral-side portion, whereby the outer contact state is gradually lost and accordingly the force transmission efficiency could be deteriorated. It might be possible to maintain the outer contact state for a longer period of time in spite of the wear of the flank surface 102, for example, by increasing a difference angle value between the cone-generating angle α and the flank angle β. However, the increase of the difference angle value between the angles α, β could cause rolling of the element 100 (i.e., inclination of the element 100 relative to the pulley 104) as shown in FIG. 7 and the consequent instability of the attitude of the element 100, whereby the force transmission efficiency and durability could be reduced. FIG. 7 shows a case of rolling of the element 100 in clockwise direction, but the element 100 could be rolled also in counterclockwise direction.

The present invention was made in view of the background art described above. It is therefore an object of the present invention to provide a transmission belt including elements each of Which has a flank angle larger than a cone-generating angle of a pulley and capable of maintaining an outer contact state for a period of time longest as possible in spite of flank surface wear.

The object indicated above is achieved according to the following aspects of the present invention.

According to a first aspect of the invention, there is provided a transmission belt that is to be mounted on a plurality of pulleys, for transmitting a force between the plurality of pulleys. The transmission belt includes: at least one endless annular hoop; and a multiplicity of plate-shaped elements that are held by the at least one endless annular hoop such that the elements are arranged in a circumferential direction of the transmission belt. The elements, each of which has a pair of flank surfaces at widthwise opposite ends thereof, are to be clamped between a pair of conical surfaces of a substantially V-shaped annular groove of each of the pulleys. A flank angle of each of the flank surfaces is larger than a cone-generating angle of each of the conical surfaces, such that, for example, the transmission belt cooperates with the pulleys to establish an outer contact state in which a pressing load acting between each of the conical surfaces and a corresponding one of the flank surfaces is larger in an outer-peripheral-side portion of the corresponding one of the flank surfaces than in an inner-peripheral-side portion of the corresponding one of the flank surfaces. The elements include first and second elements. Each of the first elements is to be in contact at the flank surfaces with the conical surfaces, and has a width larger than a width of each of the second elements, such that, for example, each of the second elements is brought into contact at the flank surfaces with the conical surfaces as wear of the flank surfaces of each of the first elements is progressed. Further, each of the flank surfaces may have a thickness which is measured substantially in the circumferential direction of the transmission belt and which is generally increased in a direction away from the inner-peripheral-side portion of the each of the flank surfaces toward the outer-peripheral-side portion of the each of the flank surfaces. It is noted that the terms "outer-peripheral-side portion" and "inner-peripheral-side portion" of the flank surface is interpreted such that the "inner-peripheral-side portion" of the flank surface is located on an inner side of the "outer-peripheral-side portion" of the flank surface in a radial direction of a corresponding one of the pulleys in a state in which the transmission belt is mounted on the pulleys. It is further noted that the present invention may be defined also by a combination of the transmission belt and the pair of pulleys.

According to a second aspect of the invention, in the transmission belt according to the first aspect of the invention, the width of each of the first elements is larger than the width of each of the second elements by a difference amount that is determined such that, when the wear of the flank surfaces of each of the first elements is progressed, the outer contact state is maintained by each of the second elements that is brought into contact at the flank surfaces with the conical surfaces. In other words, the difference amount is determined such that the flank surfaces of each of the second elements are brought into frictional contact, at their outer end portions, with the contact surfaces, before the flank surfaces of each of the first elements is brought into contact, at areas extending down to their inner peripheral end portions, with the conical surfaces.

According to a third aspect of the invention, in the transmission belt according to the first or second aspect of the invention, the flank angle of each of the flank surfaces of each of the first elements is equal to the flank angle of each of the flank surfaces of each of the second elements.

According to a fourth aspect of the invention, in the transmission belt according to any one of the first through third aspects of the invention, the width of each of the first elements is larger than the width of each of the second elements by a difference amount whose target value is larger than a maximum variation of the width of each of the first and second elements which is dependent on a dimensional tolerance of the width of each of the first and second elements.

According to a fifth aspect of the invention, in the transmission belt according to the fourth aspect of the invention, the dimensional tolerance of the width of each of the first and second elements is ±0.025 mm (namely, the maximum variation is 0.050 mm), and the target value of the difference amount is larger than 0.050 mm.

According to a sixth aspect of the invention, in the transmission belt according to any one of the first through fifth aspects of the invention, each of the elements has a pair of recesses which are symmetrical with each other with respect to a centerline in a widthwise direction of each of the elements and which open toward respective directions opposite to each other in the widthwise direction, the at least one endless annular hoop consists of a pair of endless annular hoops that are received in the pair of recesses, and the elements are held by the pair of endless annular hoops such that the elements are arranged in the circumferential direction of the transmission belt.

According to a seventh aspect of the invention, in the transmission belt according to any one of the first through sixth aspects of the invention, the substantially V-shaped annular groove of each of the pulleys has a variable width, and the transmission belt cooperates with the pulleys to constitute a belt-type continuously variable transmission.

In the transmission belt constructed according to the invention, the flank angle of each of the flank surfaces is larger than the cone-generating angle of each of the conical surfaces, for thereby establishing the outer contact state in which the pressing load acting between each of the conical surfaces and a corresponding one of the flank surfaces is larger in the outer-peripheral-side portion of the corresponding one of the flank surfaces than in the inner-peripheral-side portion of the corresponding one of the flank surfaces. Therefore, when the element enters the annular groove of the pulley, an attitude of the element is stabilized owing to the establishment of the outer contact state, whereby the force transmission efficiency is improved. Further, the multiplicity of elements include first and second elements, such that each of the first elements is to be in contact at the flank surfaces with the conical surfaces, and has a width larger than a width of each of the second elements. Each of the second elements is brought into contact at the flank surfaces with the conical surfaces as wear of the flank surfaces of each of the first elements is progressed, so that the transmission belt as a whole cooperates with the pulleys to maintain the outer contact state for a long period of time thereby making it possible to provide an improved force transmission efficiency for a long period of time. That is, due to presence of the second elements having a small width and spaced apart from the conical surfaces, the wear of the flank surfaces of the first elements is progressed somewhat rapidly. However, at a stage when the flank surfaces of the second elements are in contact with the conical surfaces so as to be worn, the wear of the flank surfaces of the second elements is progressed slowly because the flank surfaces of the first elements are in contact at large areas with the conical surfaces. Therefore, the outer contact state is maintained for a longer period of time, although a degree of the outer contact state is somewhat reduced at the stage when the flank surfaces of the first elements are in contact at large areas with the conical surfaces.

In the transmission belt according to the second aspect of the invention, the width of each of the first elements is larger than the width of each of the second elements by the difference amount that is determined such that, when the wear of the flank surfaces of each of the first elements is progressed, the outer contact state is maintained by each of the second elements that is brought into contact at the flank surfaces with the conical surfaces. Thus, the outer contact state is suitably maintained whereby the improved force transmission efficiency can be provided for a long period of time.

In the transmission belt according to each of the fourth and fifth inventions, the target value of the difference amount (by which the width of each of the first elements is larger than the width of each of the second elements) is larger than the maximum variation of the width of each of the first and second elements which is dependent on the dimensional tolerance of the width of each of the first and second elements, so that the width of each of the first elements is reliably made larger than the width of each of the second elements, for thereby reliably making it possible to maintain the outer contact state for a long period to time. Further, the target value of the difference amount can be clearly distinguished from the variation of the width of the first and second elements, which is due to a dimensional error caused in the manufacturing process, for example, in view of a frequency distribution of the actual width of the first and second elements.

In the transmission belt according to the sixth aspect of the invention, each of the elements has a pair of recesses which are symmetrical with each other with respect to a centerline in a widthwise direction of each of the elements and which open toward respective directions opposite to each other in the widthwise direction, the at least one endless annular hoop consists of a pair of endless annular hoops that are received in the pair of recesses, and the elements are held by the pair of endless annular hoops such that the elements are arranged in the circumferential direction of the transmission belt. Thus, the attitude of each of the elements is more reliably stabilized upon its entry into the substantially V-shaped annular groove of the pulleys, owing to the arrangement in which the elements are held by the pair of endless annular hoops in addition to the arrangement in which the elements are gripped between the pair of conical surfaces with the outer contact state being established.

DETAILED DESCRIPTION OF PREFERRED EMBODIMENT

Figure 1:
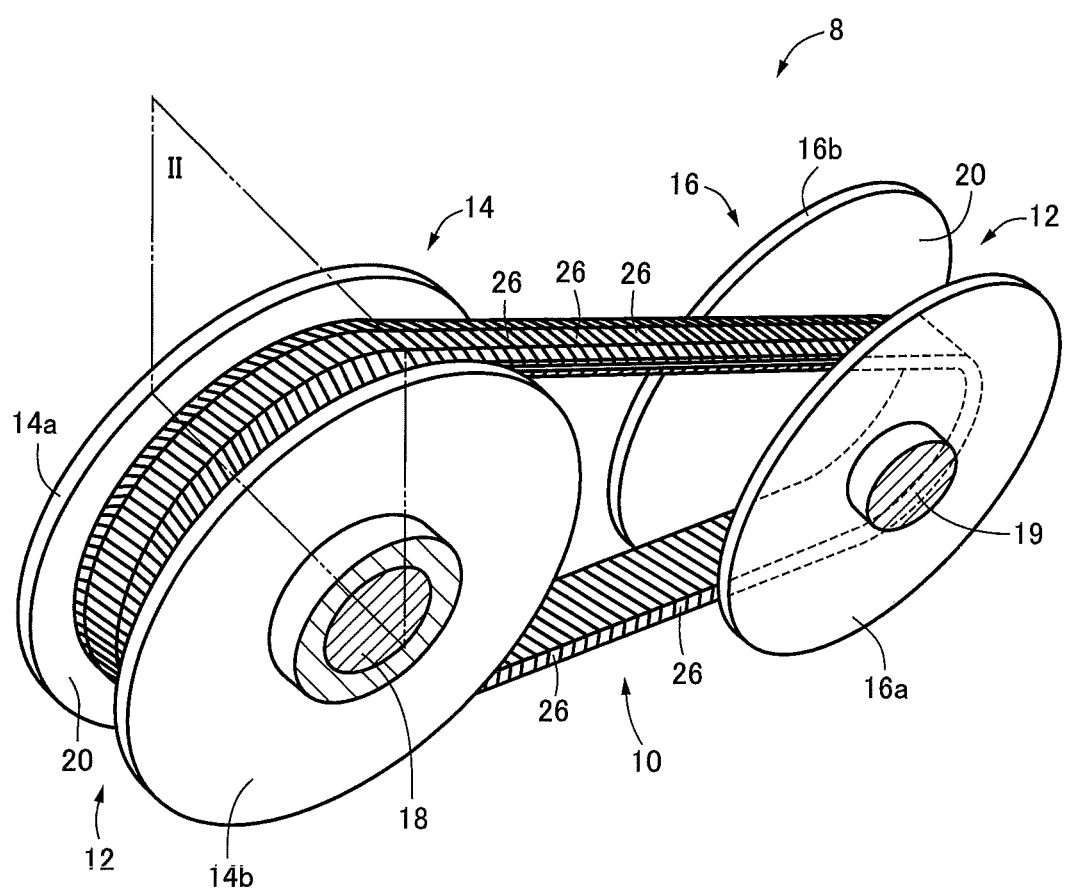
FIG. 1 is a perspective view showing, by way of example, a vehicle belt-type continuously variable transmission including a transmission belt constructed according to an embodiment of the invention.

The present invention is advantageously applicable to a transmission belt that is to be used in a belt-type continuously variable transmission for a vehicle. However, the invention is applicable also to any of other various kinds of transmission belts such as a transmission belt to be used in any device or apparatus other than a vehicle, a transmission belt to be mounted on a pair of pulleys that provides a constant gear ratio, and a transmission belt to be mounted on three or more pulleys. The transmission belt according to the invention may include a multiplicity of elements each having a pair of recesses which are symmetrical with each other with respect to a centerline in its widthwise direction and which open toward respective directions opposite to each other in the widthwise direction, such that hoops are received in the respective recesses. However, each of the elements included in the transmission belt may have a single recess in which a single hoop is received.

The multiplicity of elements may consist of only two types of elements in the form of first elements having a larger width and second elements having a smaller width. However, the elements may include three or more types of elements that are different in width. Where the elements consist of only the first and second elements, it is preferable that the first and second elements are alternately arranged in a circumferential direction of the transmission belt. However, the first and second elements may be arranged at random in the circumferential direction as long as not being distributed unevenly in the circumferential direction. The same thing can be said of a case in which the elements include three or more types of elements that are different in width. Further, it is preferable that the difference amount between or among the widths of the plurality of types of elements is determined by taking account of various factors such the flank angle, such that the outer contact state is maintained irrespective of the wear of the flank surfaces. However, the difference amount may be any value as long as the flank surfaces of the second elements are bought into contact with the conical surfaces when the wear of the flank surfaces of the first elements are progressed. That is, it is possible to ensure technical advantages provided by the invention, even where the outer contact state is temporarily lost, for example, due to a dimensional error and then the outer contact state is stored by progress of the wear.

The flank angles of the plurality of types of the elements do not necessarily have to be equal to each other or one another, but may be different from each other or one another as long as the flank angles are larger than the cone-generating angle. For example, the flank angle of the first elements may be either larger or smaller than the flank angle of the second elements. Further, the target value of the difference amount between or among the widths of the plurality of types of elements is determined, for example, to be larger than the maximum variation of the width of each of the elements which is dependent on the dimensional tolerance of the width of each of the elements. However, the target value of the difference amount may be determined without taking account of the dimensional tolerance. In such a case, too, the target value of the difference amount can be clearly distinguished from the variation of the width of the elements, which is due to the dimensional error, for example, in view of a frequency distribution of the actual width of the first and second elements. Further, for example, the dimensional tolerance is ±0.025 mm, and the target value of the difference amount is larger than 0.050 mm. However, the dimensional tolerance and the difference amount may be determined suitably depending on, for example, sizes of the elements and required accuracy.

EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Figure 2:
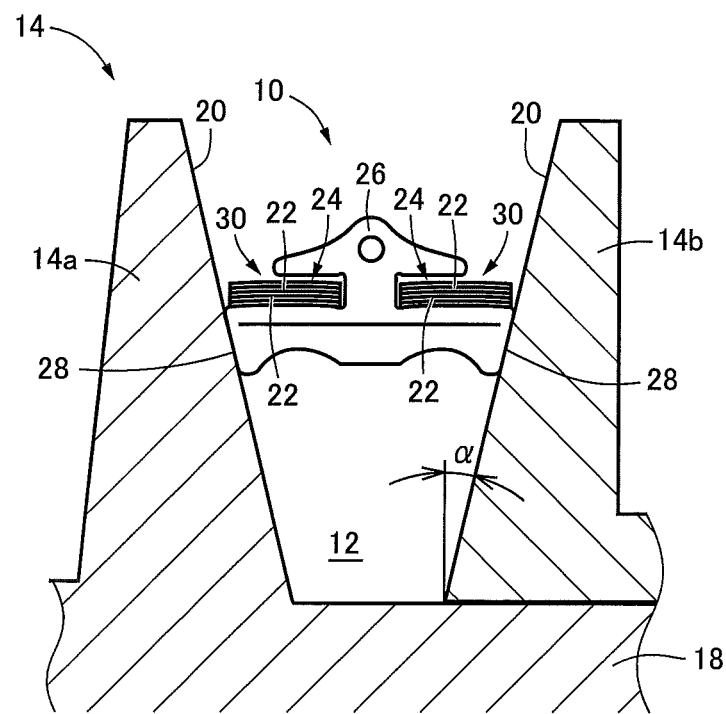
FIG. 2 is a cross sectional view taken in a plane II shown in FIG. 1.
Figure 3:
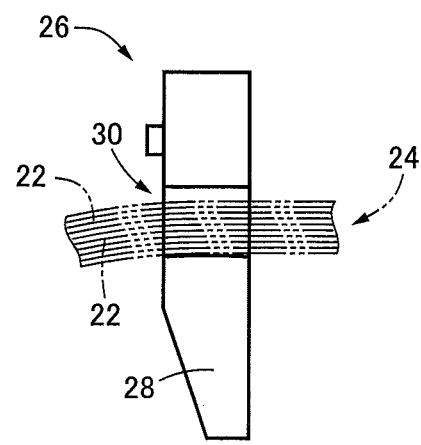
FIG. 3 is a side view of one of elements shown in FIGS. 1 and 2.

FIG. 1 is a perspective view showing a vehicle belt-type continuously variable transmission 8 including a transmission belt 10 constructed according to the embodiment of the invention. FIG. 2 is a cross sectional view taken in a plane II shown in FIG. 1. FIG. 3 is a side view of one of elements 26 shown in FIGS. 1 and 2. The belt-type continuously variable transmission 8 includes a pair of variable pulleys 14, 16 rotatable about respective axes that are parallel to each other. Each of the pulleys 14, 16 has, in its outer peripheral portion, a substantially V-shaped annular groove 12 (hereinafter simply referred to as "V-shaped groove") having a variable width. The transmission belt 10 is looped over the pulleys 14, 16, namely, is mounted on the pulleys 14, 16. The pulley 14 includes a fixed rotary body 14a and a movable rotary body 14b that are both mounted on a rotary shaft 18 such that the fixed rotary body 14a is fixed to the rotary shaft 18 while the movable rotary body 14b is axially movable relative to the rotary shaft 18. Similarly, the pulley 16 includes a fixed rotary body 16a and a movable rotary body 16b that are both mounted on a rotary shaft 19 such that the fixed rotary body 16a is fixed to the rotary shaft 19 while the movable rotary body 16b is axially movable relative to the rotary shaft 19. Each of the movable rotary bodies 14b, 16b is to be pressed or forced by a pressing device (not shown) such as a hydraulic cylinder in a direction toward a corresponding one of the fixed rotary bodies 14a, 16a. Conical surfaces (tapered surfaces) 20 are provided on mutually opposed surfaces of the respective fixed and movable rotary bodies 14a, 14b, and also on mutually opposed surfaces of the respective fixed and movable rotary bodies 16a, 16b. The conical surfaces 20 cooperate with each other to define an axial distance therebetween, which is gradually increased outwardly in a radial direction of a corresponding one of the pulleys 14, 16. The above-described V-shaped groove 12 is defined by the conical surfaces 20 that are opposed to each other in an axial direction of a corresponding one of the pulleys 14, 16.

The transmission belt 10 includes a pair of endless annular hoops 24 and a multiplicity of plate-shaped elements 26 that are held by the hoops 24 so as to be arranged in its thickness direction corresponding to the circumferential direction of the transmission belt 10. Each of the hoops 24 is constituted by annular layers in the form of a plurality of rings 22 which are superposed on each other. Each of the rings 22 is made of a flexible metal thin plate such as high-tensile steel plate that is formed to a ring shape. Each of the elements 26 is made of a thick plate-shaped metal member that is formed by stamping, for example, a steel plate having a thickness of about several millimeters. The multiplicity of plate-shaped elements 26 consists of about several hundreds (about 300-300) of elements 26. As shown in FIG. 2, each element 26 has a pair of flank surfaces 28 at widthwise opposite ends thereof, and is to be clamped at the flank surfaces 28 between the pair of conical surfaces 20, so as to be in frictional contact with the conical surfaces 20, for thereby transmitting a power or force between the pulleys 14, 16. Each element 26 further has a pair of recesses 30 which are symmetrical with each other with respect to a centerline S (see FIG. 4) in a widthwise direction of the element 26 and which open toward respective directions opposite to each other in the widthwise direction. The recesses 30 of the elements 26 are arranged to be contiguous and located in an outer-peripheral-side portion (i.e., upper portion of FIG. 2) of the flank surfaces 28. With the hoops 24 being received in the recesses 30 of the elements 26, the elements 26 are held by the hoops 24 such that the elements 26 are arranged in arranged in the circumferential direction of the transmission belt 10. As shown in FIG. 3, each of the flank surfaces 28 of the elements 26 has a thickness which is measured substantially in the circumferential direction of the transmission belt 10 and which is generally increased in an upward direction as seen in FIG. 3, i.e., in a direction away from an inner-peripheral-side portion of the flank surface 28 toward an outer-peripheral-side portion of the flank surface 28.

With the transmission belt 10, which is constructed as described above, being mounted on the pair of pulleys 14, 16 and circulated in the circumferential direction, the force is transmitted between the pulleys 14, 16. That is, portions of the transmission belt 10, which are mounted on the pulleys 14, 16, namely, in which the flank surfaces 28 of the elements 26 are in contact with the conical surfaces 20 of the pulleys 14, 16, are compressed at the flank surfaces 28 between the conical surfaces 20 so as to be in pressing contact with the conical surfaces 20, owing to a tension given to the transmission belt 10, and the force is transmitted between the pulleys 14, 16 through the transmission belt 10 owing to friction generated between the flank surfaces 28 and the conical surfaces 20 that are in frictional contact.

Figure 4:
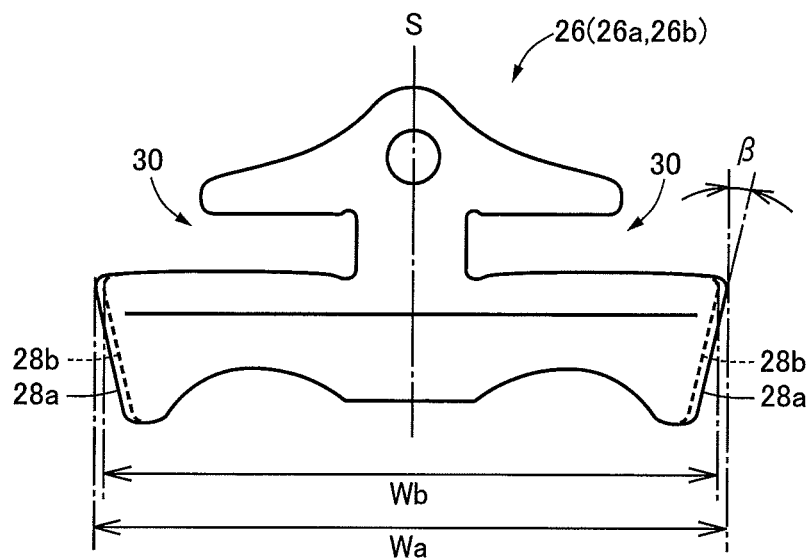
FIG. 4 is a front view of two types of elements in the form of first and second elements that are different in width.

In the present embodiment, the multiplicity of elements 26 consist of two types of elements in the form of first elements 26a and second elements 26b, which are different in width, as indicated by solid line and broken line in FIG. 4. The number of the first elements 26a and the number of the second elements 26b are substantially equal to each other, and the first and second elements 26a, 26b are alternately arranged in the circumferential direction of the transmission belt 10, for example. However, the first and second elements 26a, 26b may be arranged at random in the circumferential direction.

Figure 5:
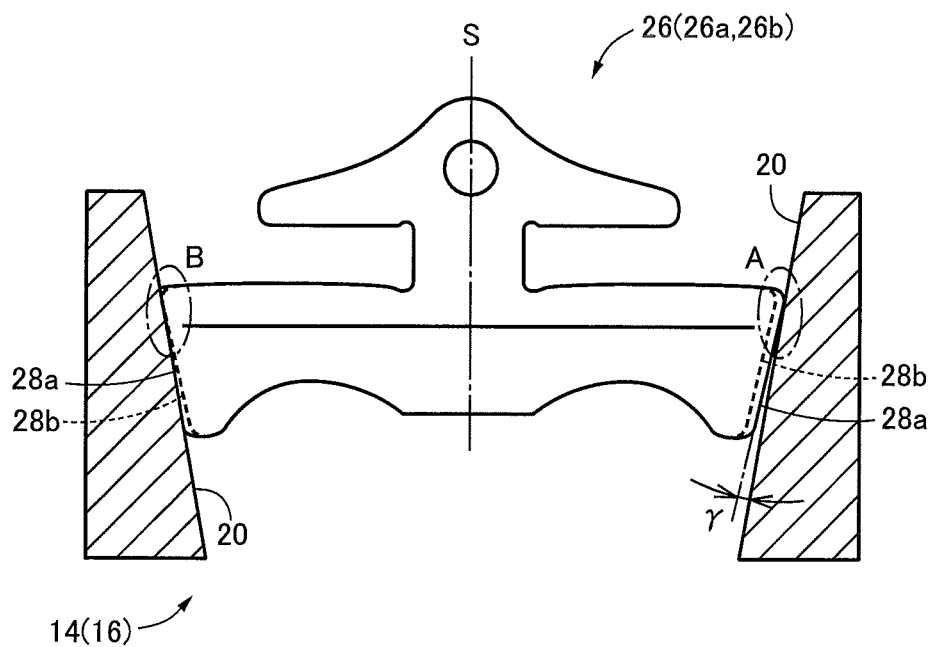
FIG. 5 is a front view showing two states in which the two types of elements of FIG. 4 are clamped between a pair of conical surfaces of a variable pulley, wherein the state shown in right-side portion of FIG. 5 corresponds to an early stage and the state shown in left-side portion of FIG. 5 corresponds to a later stage in which the first element having a larger width is worn and the second element having a smaller width is in frictional contact at its flank surfaces with the conical surfaces of the variable pulley.
Figure 6:
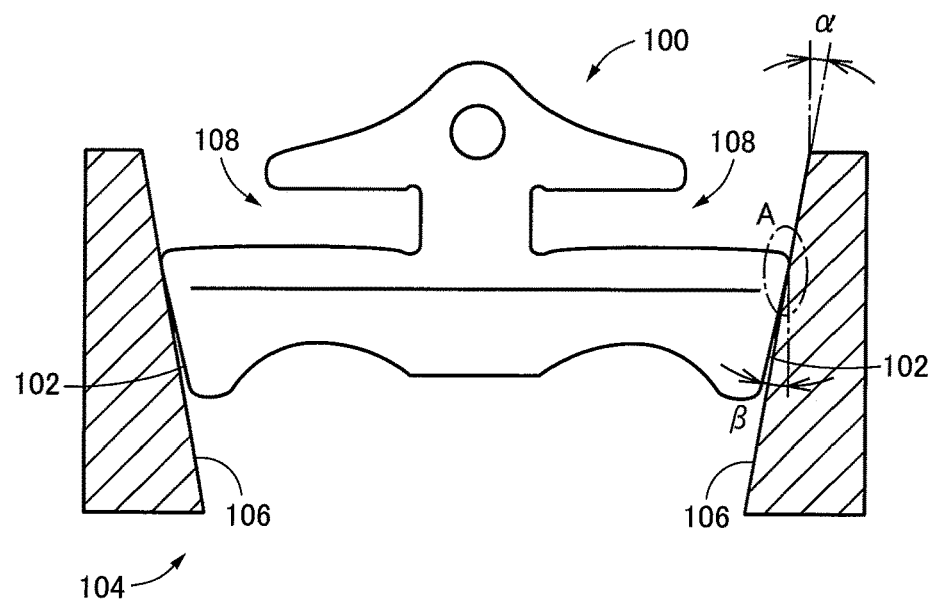
FIG. 6 is a front view showing an outer contact state established by an arrangement in which the element having a flank angle β that is larger than a cone-generating angle α of the conical surface of the pulley.
Figure 7:
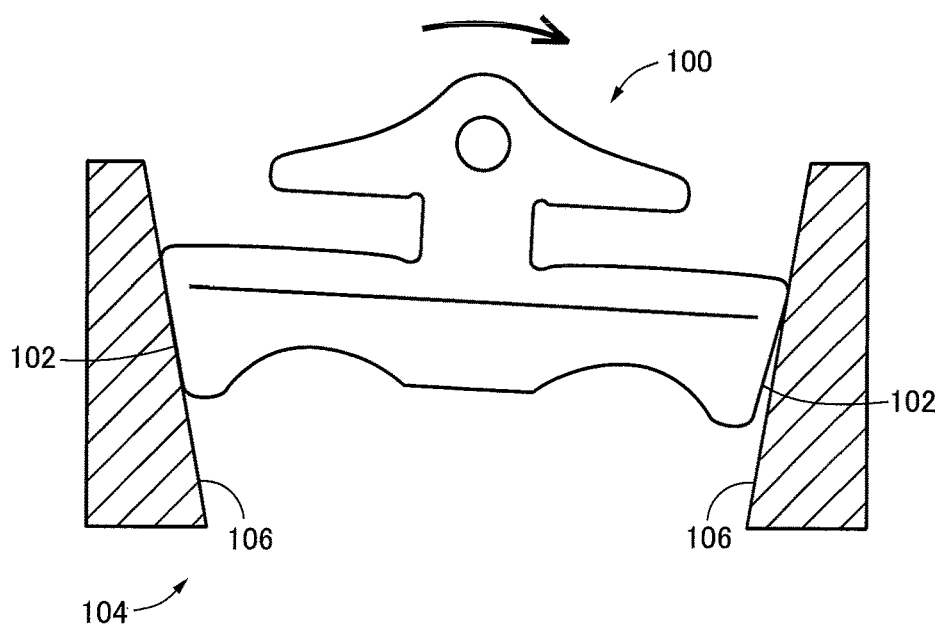
FIG. 7 is a front view showing rolling of the element.

As shown in FIG. 4, the width (target value) of the first elements 26a (whose flank surfaces 28a are indicated by solid lines) is larger than the width (target value) of the second elements 26b (whose flank surfaces 28b are indicated by broken lines). Therefore, at an early stage, the flank surfaces 28a of the first elements 26a are in contact with the conical surfaces 20 of the pulleys 14, 16 while the flank surfaces 28b of the second elements 26b are spaced apart from the conical surfaces 20 of the pulleys 14, 16, as shown in right-side portion of FIG. 5 (that is on right side of the centerline S in FIG. 5). Then, at a later stage at which wear of the flank surfaces 28a of the first elements 26a is progressed with the flank surfaces 28a being worn by an amount corresponding to a difference amount ΔW (=Wa−Wb) between the width Wa and width Wb (namely, with each of the flank surfaces 28a being worn by an amount corresponding to a half of the difference amount ΔW), the flank surfaces 28b of the second elements 26b in addition to the flank surfaces 28a of the first elements 26a are brought into frictional contact with the conical surfaces 20 of the pulleys 14, 16, as shown in left-side portion of FIG. 5 (that is on left side of the centerline S in FIG. 5). It is noted that each of the first and second elements 26a, 28b is constructed to be symmetrical with respect to the centerline S, so that a flank angle β of the right-side flank surfaces 28a, 28b and a flank angle β of the left-side flank surfaces 28a, 28b are equal to each other. The flank angle β is an angle defined between the flank surface 28 and a plane perpendicular to the widthwise direction of the element 26, as is apparent from FIGS. 4 and 6.

The flank angle β of the flank surfaces 28a of the first elements 26a and the flank angle β of the flank surfaces 28b of the second elements 26b are equal to each other. The flank angle β is larger than a cone-generating angle α (see FIG. 2) of the conical surfaces 20 of the pulleys 14, 16. Therefore, as shown in right-side portion of FIG. 5, at the early stage at which the flank surfaces 28a of the first elements 26a are in frictional contact with the conical surfaces 20, the transmission belt 10 cooperates with the pulleys 14, 16 to establish an outer contact state in which a pressing load acting between the conical surface 20 and the flank surface 28a is larger in an outer-peripheral-side portion A of the flank surface 28a than in an inner-peripheral-side portion of the flank surface 28a. Further, as shown in left-side portion of FIG. 5, at the later stage at which the flank surfaces 28b of the second elements 26b are in frictional contact with the conical surfaces 20 as a result of progress of wear of the flank surfaces 28a of the first elements 26a, too, the transmission belt 10 cooperate with the pulleys 14, 16 to establish the outer contact state in which the pressing load acting between the conical surface 20 and the flank surface 28b is larger in an outer-peripheral-side portion B of the flank surface 28b than in an inner-peripheral-side portion of the flank surface 28b. In this later stage, although the flank surface 28a of the first element 26a is in frictional contact, at an area extending down to its inner peripheral end portion or to vicinity of the inner peripheral end portion, with the conical surface 20, the flank surface 28b of the second element 26b is in frictional contact at the outer-peripheral-side portion B with the conical surface 20, so that the transmission belt 10 as a whole cooperates with the pulleys 14, 16 to establish the outer contact state in which the pressing load is larger in the outer-peripheral-side portion than in the inner-peripheral-side portion. It is noted that the cone-generating angle α is an angle defined between the conical surface 20 and a plane perpendicular to an axis of the pulley, namely, corresponds to a value obtained by subtracting a tapered angle of the conical surface 20 from 90°, as is apparent from FIGS. 2 and 6.

The difference amount ΔW (=Wa−Wb) between the width Wa of each first element 26a and the width Wb of each second element 26b is determined, by taking account of various factors such as a dimensional tolerance of each of the width Wa and width Wb and a difference angle value γ (see FIG. 5) between the flank angle β and the cone-generating angle α, such that, when the wear of the flank surfaces 28a of each first element 26a is progressed, each second element 26b is brought into contact at the flank surfaces 28b with the conical surfaces 20, whereby the transmission belt 10 as a whole cooperates with the pulleys 14, 16 to maintain the outer contact state in spite of the wear of the flank surfaces 28a of each first element 26a. Specifically described, the difference amount ΔW is determined based on the difference angle value γ, such that the flank surface 28b of each second element 26b is brought into frictional contact, at its outer peripheral end portion, with the contact surface 20, before the flank surface 28a of each first element 26a is brought into contact, at an area extending down to its inner peripheral end portion, with the conical surface 20. The difference amount ΔW is larger than a possible maximum variation of each of the widths Wa, Wb which is dependent on a dimensional tolerance of each of the widths Wa, Wb. Where the dimensional tolerance is ±0.025 mm, the difference amount ΔW is set to be larger than 0.050 mm.

In the transmission belt 10 according to the embodiment of the invention, the flank angle β of each of the flank surfaces 28a, 28b is larger than the cone-generating angle α of each of the conical surfaces 20, for thereby establishing the outer contact state in which the pressing load acting between each of the conical surfaces 20 and a corresponding one of the flank surfaces 28a, 28b is larger in the outer-peripheral-side portion of the corresponding one of the flank surfaces 28a, 28b than in the inner-peripheral-side portion of the corresponding one of the flank surfaces 28a, 28b. Therefore, when the elements 26a, 26b enter the V-shaped groove 12 of the pulleys 14, 16, the attitude of the elements 26a, 26b is stabilized owing to the establishment of the outer contact state, whereby the force transmission efficiency is improved. Further, the multiplicity of elements 26 include first and second elements 26a, 26b, such that each of the first elements 26a is to be in contact at the flank surfaces 28a with the conical surfaces 20, and has a width larger than a width of each of the second elements 26b that are spaced apart from the conical surfaces 20. Each of the second elements 26b is brought into contact at the flank surfaces 28b with the conical surfaces 20 as wear of the flank surfaces 28a of each of the first elements 26a is progressed, so that the transmission belt 10 as a whole cooperates with the pulleys 14, 16 to maintain the outer contact state for a long period of time thereby making it possible to provide an improved force transmission efficiency for a long period of time. That is, due to presence of the second elements 26b having a small width and spaced apart from the conical surfaces 20, the wear of the flank surfaces 28a of the first elements 26a is progressed somewhat rapidly. However, at a stage when the flank surfaces 28b of the second elements 26b are in contact with the conical surfaces 20 so as to be worn, the wear of the flank surfaces 28b of the second elements 26b is progressed slowly because the flank surfaces 28a of the first elements 26a are in contact at large areas with the conical surfaces 20. Therefore, the outer contact state is maintained for a longer period of time, although a degree of the outer contact state is somewhat reduced at the stage when the flank surfaces 28a of the first elements 26a are in contact at large areas with the conical surfaces 20.

Further, the width Wa of each of the first elements 26a is larger than the width Wb of each of the second elements 26b by the difference amount ΔW that is determined such that, when the wear of the flank surfaces 28a of each of the first elements 26a is progressed, the outer contact state is maintained by each of the second elements 26b that is brought into contact at the flank surfaces 28b with the conical surfaces 20. Thus, the outer contact state is suitably maintained whereby the improved force transmission efficiency can be provided for a long period of time.

The target value of the difference amount ΔW (by which the width Wa of each first element 26a is larger than the width Wb of each second element 26b) is larger than the maximum variation of the width of each of the first and second elements 26a, 26b which is dependent on the dimensional tolerance of the width of each of the first and second elements 26a, 26b, so that the width Wa of each first element 26a is reliably made larger than the width Wb of each second element 26b, for thereby reliably making it possible to maintain the outer contact state for a long period to time. Further, the target value of the difference amount ΔW can be clearly distinguished from the variation of the width of the first and second elements 26a, 26b, which is due to a dimensional error caused in the manufacturing process, for example, in view of a frequency distribution of the actual width of the first and second elements 26a, 26b.

Each of the elements 26a, 26b has a pair of recesses 30 which are symmetrical with each other with respect to the centerline S in the widthwise direction of each of the elements 26a, 26b and which open toward respective directions opposite to each other in the widthwise direction, and the elements 26a, 26b are held by the pair of hoops 24 such that the elements are arranged in the circumferential direction of the transmission belt 10. Thus, the attitude of each of the elements 26a, 26b is more reliably stabilized upon its entry into the V-shaped groove 12 of the pulleys 14, 16, owing to the arrangement in which the elements 26a, 26b are held by the pair of hoops 24 in addition to the arrangement in which the elements 26a, 26b are gripped between the pair of conical surfaces 20 in the outer contact state.

It is to be understood that the embodiment described above is given for illustrative purpose only, and that the present invention may be embodied with various modifications and improvements Which may occur to those skilled in the art.

NOMENCLATURE OF ELEMENTS

8: belt-type continuously variable transmission
10: transmission belt
14, 16: variable pulleys (pulleys)
20: conical surface 24: hoop
26: element
26a: first element
26b: second element
28, 28a, 28b: flank surfaces
30: recesses
α: cone-generating angle
β: flank angle
A, B: outer-peripheral-side portion
Wa, Wb: width (target value)

What is claimed is:

1. A transmission belt that is to be mounted on a plurality of pulleys, for transmitting a force between the plurality of pulleys, said transmission belt comprising:
   at least one endless annular hoop; and
   a multiplicity of plate-shaped elements that are held by said at least one endless annular hoop such that said elements are arranged in a circumferential direction of said transmission belt,
   wherein said elements, each of which has a pair of flank surfaces at widthwise opposite ends thereof, are to be clamped between a pair of conical surfaces of a substantially V-shaped annular groove of each of the pulleys,
   wherein a flank angle of each of said flank surfaces is larger than a cone-generating angle of each of the conical surfaces,
   wherein said elements include first and second elements, such that each of said first elements is to be in contact at said flank surfaces with the conical surfaces, and has a width larger than a width of each of said second elements,
   wherein said transmission belt cooperates with the pulleys to establish an outer contact state in which a pressing load acting between each of the conical surfaces and a corresponding one of said flank surfaces is larger in an outer-peripheral-side portion of said corresponding one of said flank surfaces than in an inner-peripheral-side portion of said corresponding one of said flank surfaces, said inner-peripheral-side portion being located on an inner side of said outer-peripheral-side portion in a radial direction of a corresponding one of the pulleys, and
   wherein each of said second elements is brought into contact at said flank surfaces with the conical surfaces as wear of said flank surfaces of each of said first elements is progressed.

2. The transmission belt according to claim 1, wherein the width of each of said first elements is larger than the width of each of said second elements by a difference amount that is determined such that, when the wear of said flank surfaces of each of said first elements is progressed, said outer contact state is maintained by each of said second elements that is brought into contact at said flank surfaces with the conical surfaces.

3. The transmission belt according to claim 1, wherein the flank angle of each of said flank surfaces of each of said first elements is equal to the flank angle of each of said flank surfaces of each of said second elements.

4. The transmission belt according to claim 1, wherein the width of each of said first elements is larger than the width of each of said second elements by a difference amount whose target value is larger than a maximum variation of the width of each of said first and second elements which is dependent on a dimensional tolerance of the width of each of said first and second elements.

5. The transmission belt according to claim 4,
   wherein the dimensional tolerance of the width of each of said first and second elements is ±0.025 mm, and
   wherein the target value of the difference amount is larger than 0.050 mm.

6. The transmission belt according to claim 1,
   wherein each of said elements has a pair of recesses which are symmetrical with each other with respect to a centerline in a widthwise direction of each of said elements and which open toward respective directions opposite to each other in the widthwise direction,
   wherein said at least one endless annular hoop consists of a pair of endless annular hoops that are received in said pair of recesses, and
   wherein said elements are held by said pair of endless annular hoops such that said elements are arranged in the circumferential direction of said transmission belt.

7. The transmission belt according to claim 1,
   wherein said substantially V-shaped annular groove of each of the pulleys has a variable width, and
   said transmission belt cooperates with the pulleys to constitute a belt-type continuously variable transmission.

8. The transmission belt according to claim 1, wherein each of said flank surfaces has a thickness which is measured substantially in the circumferential direction of said transmission belt and which is generally increased in a direction away from an inner-peripheral-side portion of said each of said flank surfaces toward an outer-peripheral-side portion of said each of said flank surfaces.

* * * * *